Aug. 20, 1968     W. W. DANUSER     3,397,521
ROTATABLE DOUBLE-HEADED LAWNMOWER
Filed Dec. 15, 1964     7 Sheets—Sheet 1

INVENTOR.
Walter W. Danuser,
BY Parker & Carter
Attorneys.

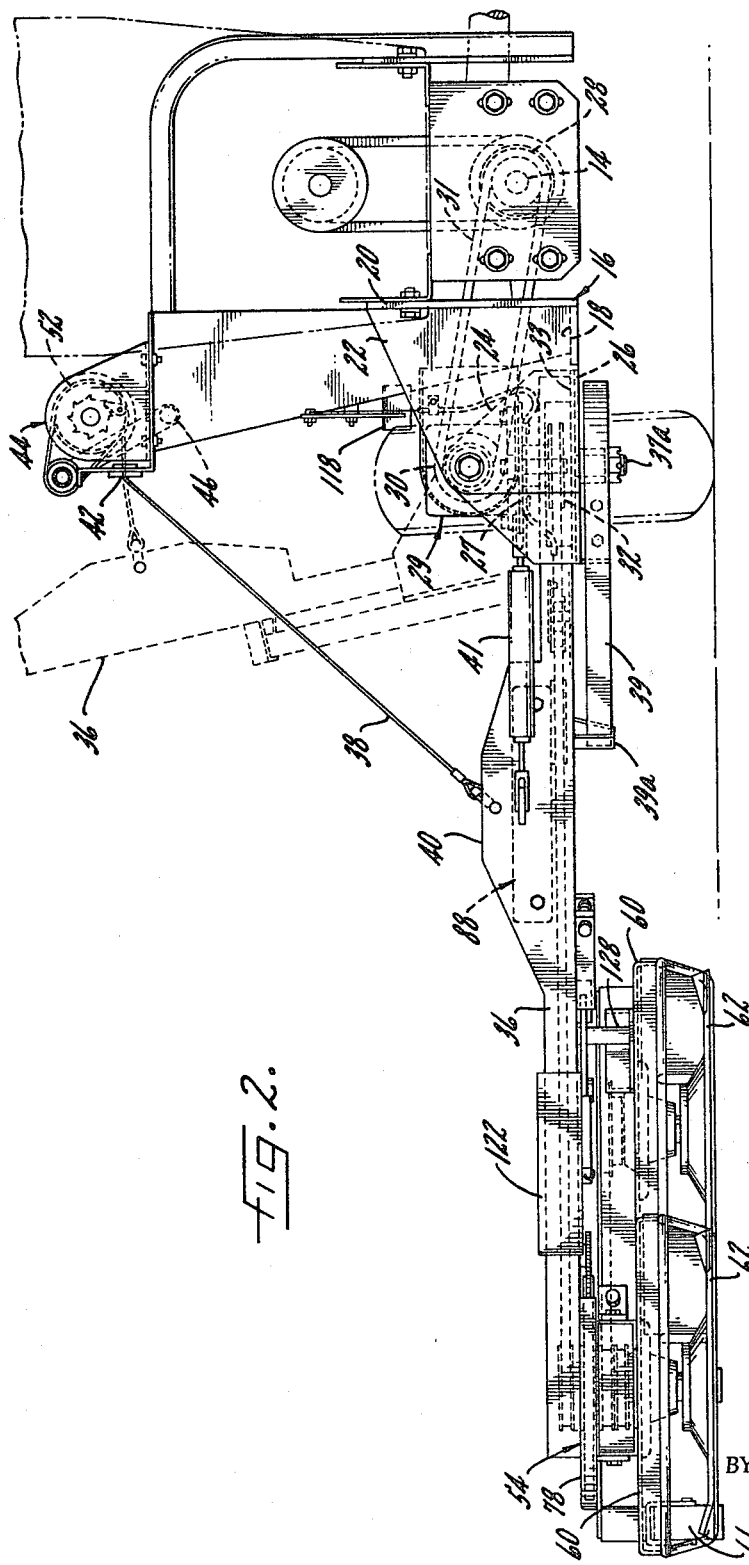

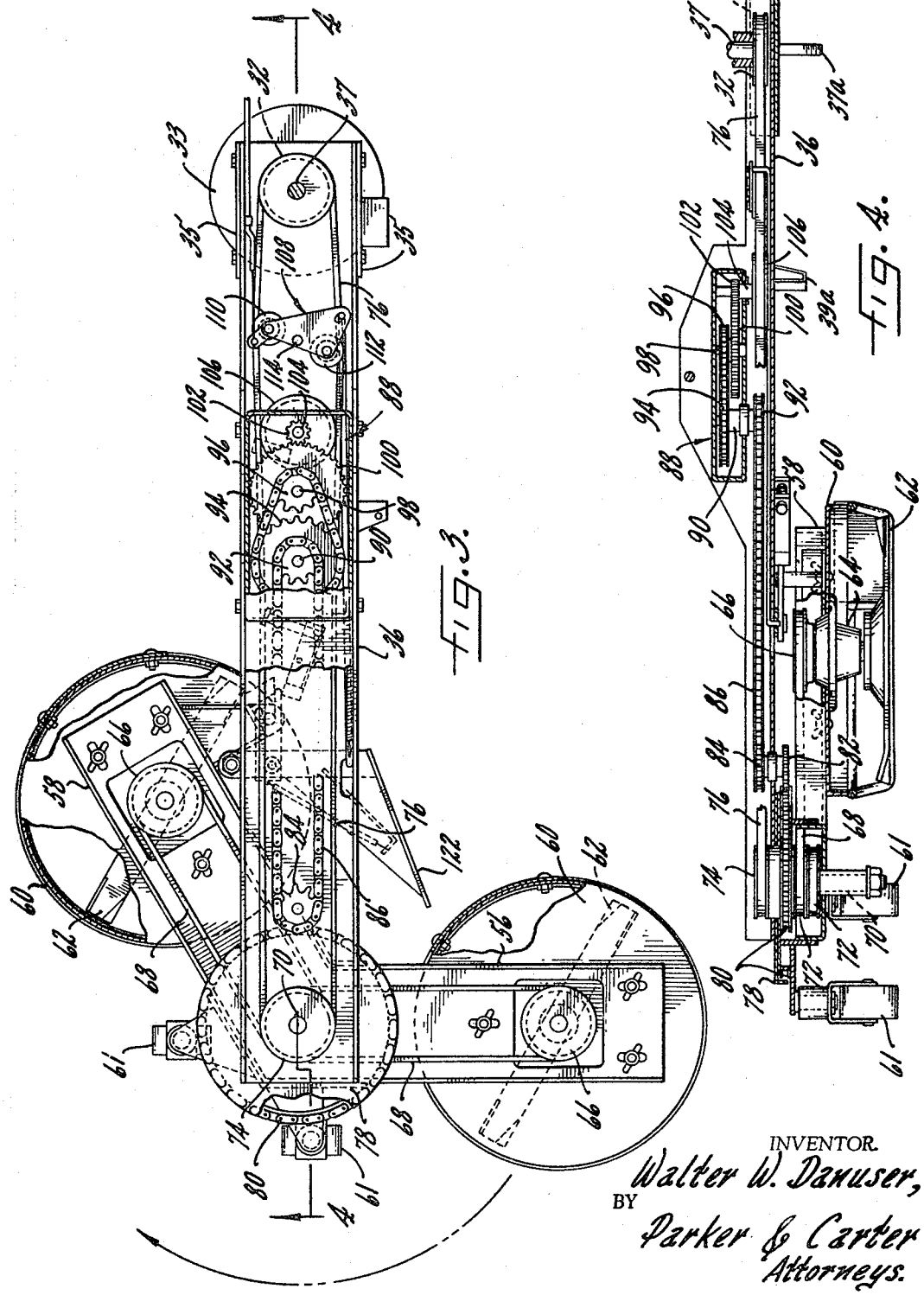

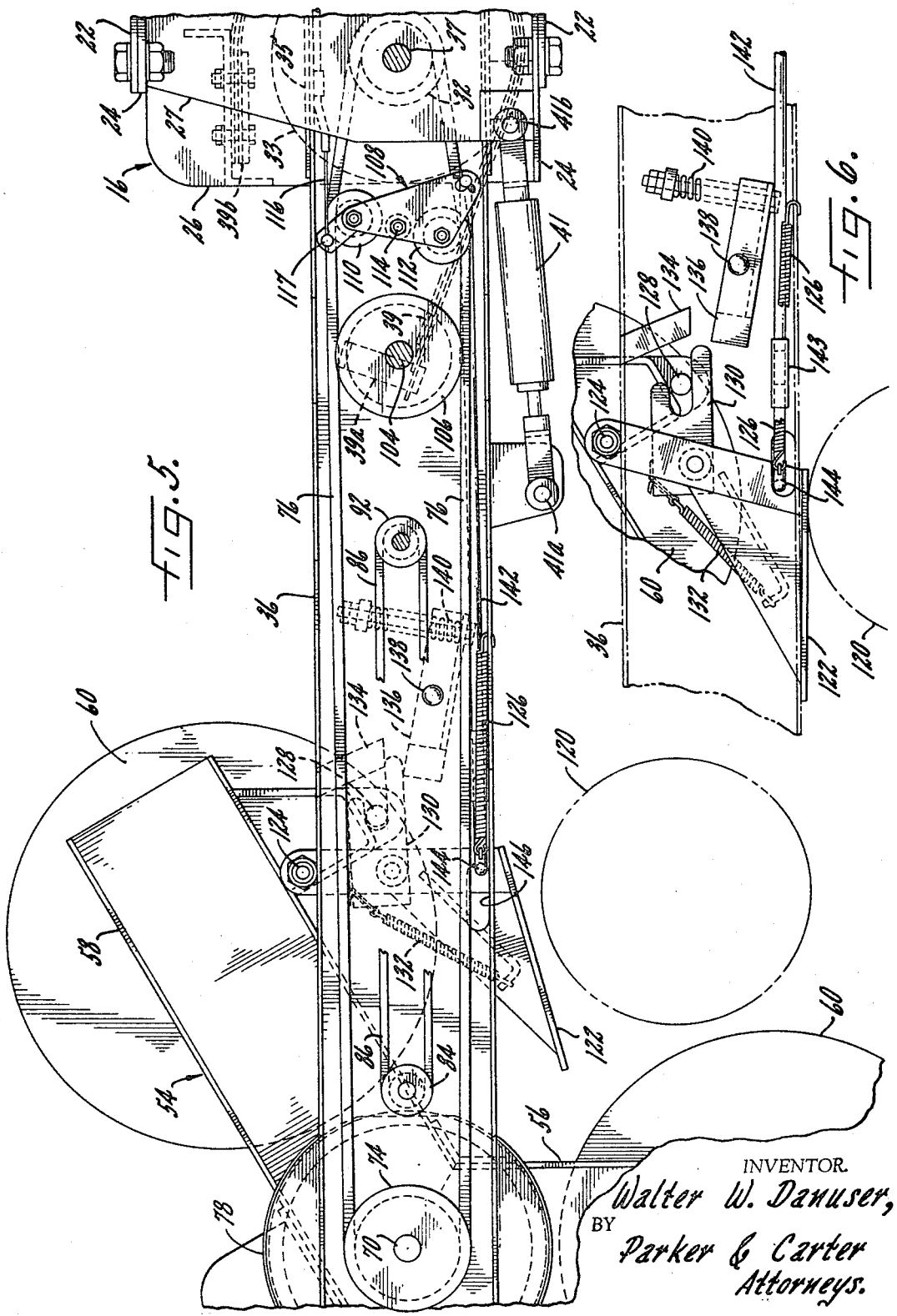

Aug. 20, 1968  W. W. DANUSER  3,397,521
ROTATABLE DOUBLE-HEADED LAWNMOWER
Filed Dec. 15, 1964  7 Sheets-Sheet 5

INVENTOR.
Walter W. Danuser,
BY Parker & Carter
Attorneys.

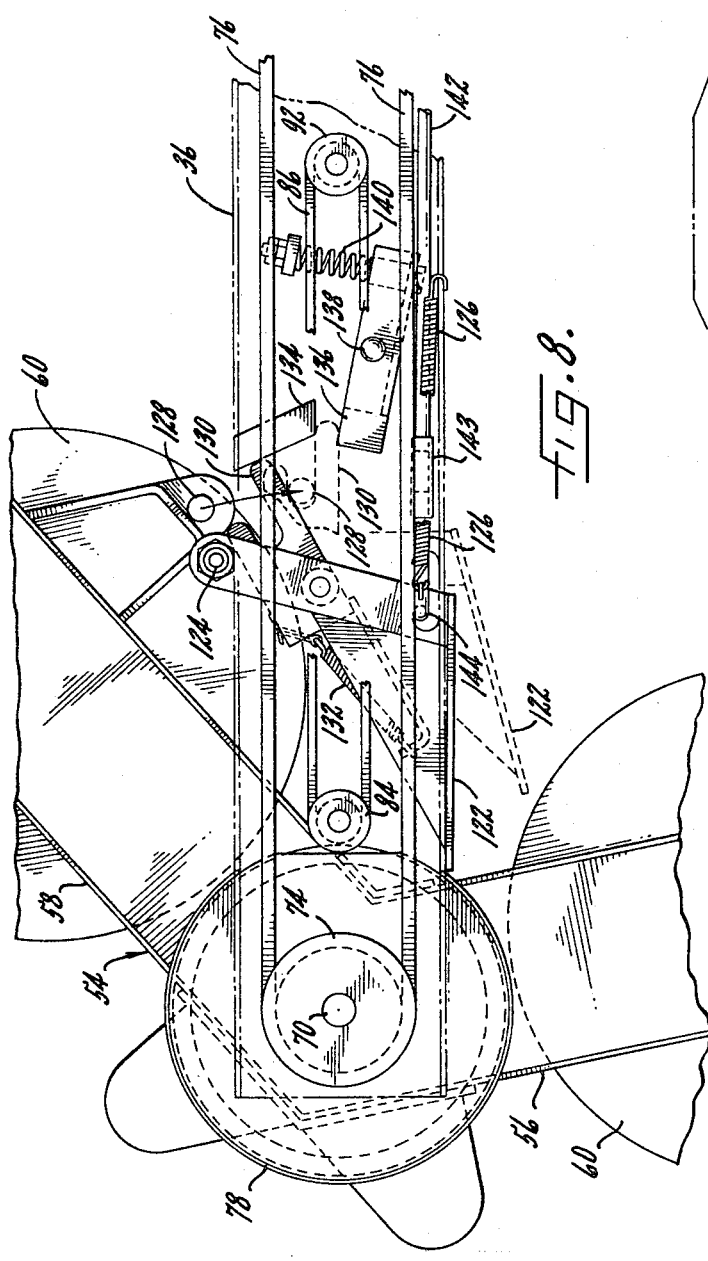

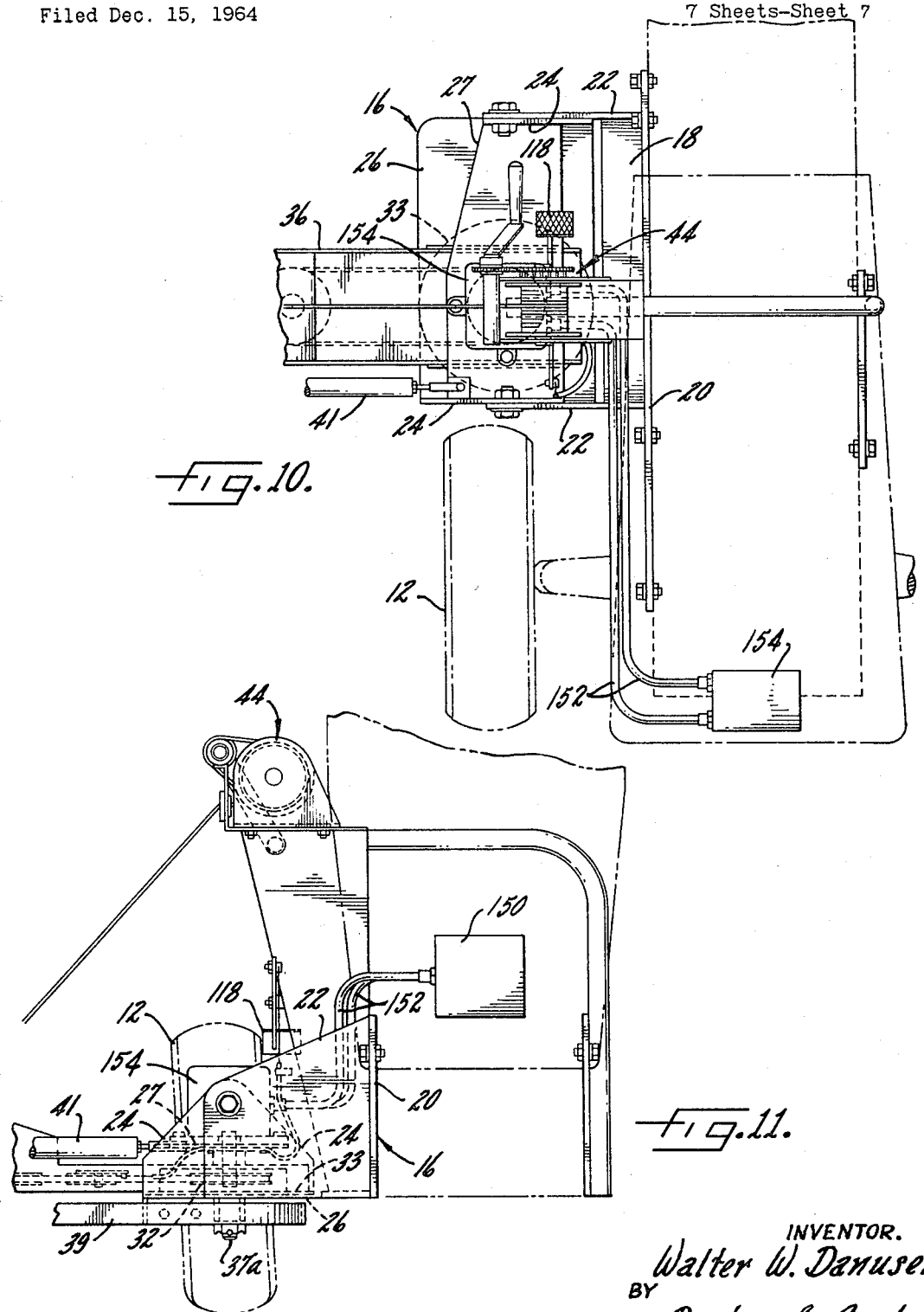

United States Patent Office 3,397,521
Patented Aug. 20, 1968

3,397,521
ROTATABLE DOUBLE-HEADED LAWNMOWER
Walter W. Danuser, Tulsa, Okla., assignor to Danuser Machine Works, Inc., Tulsa, Okla., a corporation of Delaware
Filed Dec. 15, 1964, Ser. No. 418,474
12 Claims. (Cl. 56—25.4)

ABSTRACT OF THE DISCLOSURE

This invention relates to a rotary mower of the type which can mow about stationary objects, for example fence posts and the like. The invention comprises a pair of spaced mowing blades rotatable on arms which extend outwardly from a movable frame. The arms and rotatable blades are arranged to traverse through a complete arc in mowing about an object with initiation of such rotary movement being caused either by the mower operator or by contact with an object in the mowing path. Rotation of the arms and blades is in only one direction and is accomplished by a positive drive.

---

This invention relates to a double-headed mower, and particularly to a mower of this type which can mow about posts and other stationary objects in the mowing path.

A primary purpose of the invention is a double-headed mower of the type described in which the mowing heads are rotatable upon contact with an object in the mowing path.

Another purpose is a mower in which the cutting heads can be rotated or pivoted through a predetermined arc to mow about an object in the mowing path.

Another purpose is a mower of the type described in which the mower blades are automatically rotated upon contact with a portion of the supporting frame with an object in the mowing path.

Another purpose is a mower of the type described which can be mounted on a tractor, or similar vehicle.

Another purpose is a double-headed mower which can be used to satisfactorily mow a straight, curved or other path in an area to be mowed and which can mow about an object in the mowing path.

Another purpose is a mower of the type described including means for starting rotation of the mower heads and for continuing such rotation as long as desired by the operator.

Another purpose is a reliably operable rotatable mower of the type described.

Other purposes will appear in the ensuing specification, drawings and claims.

Figure 1:
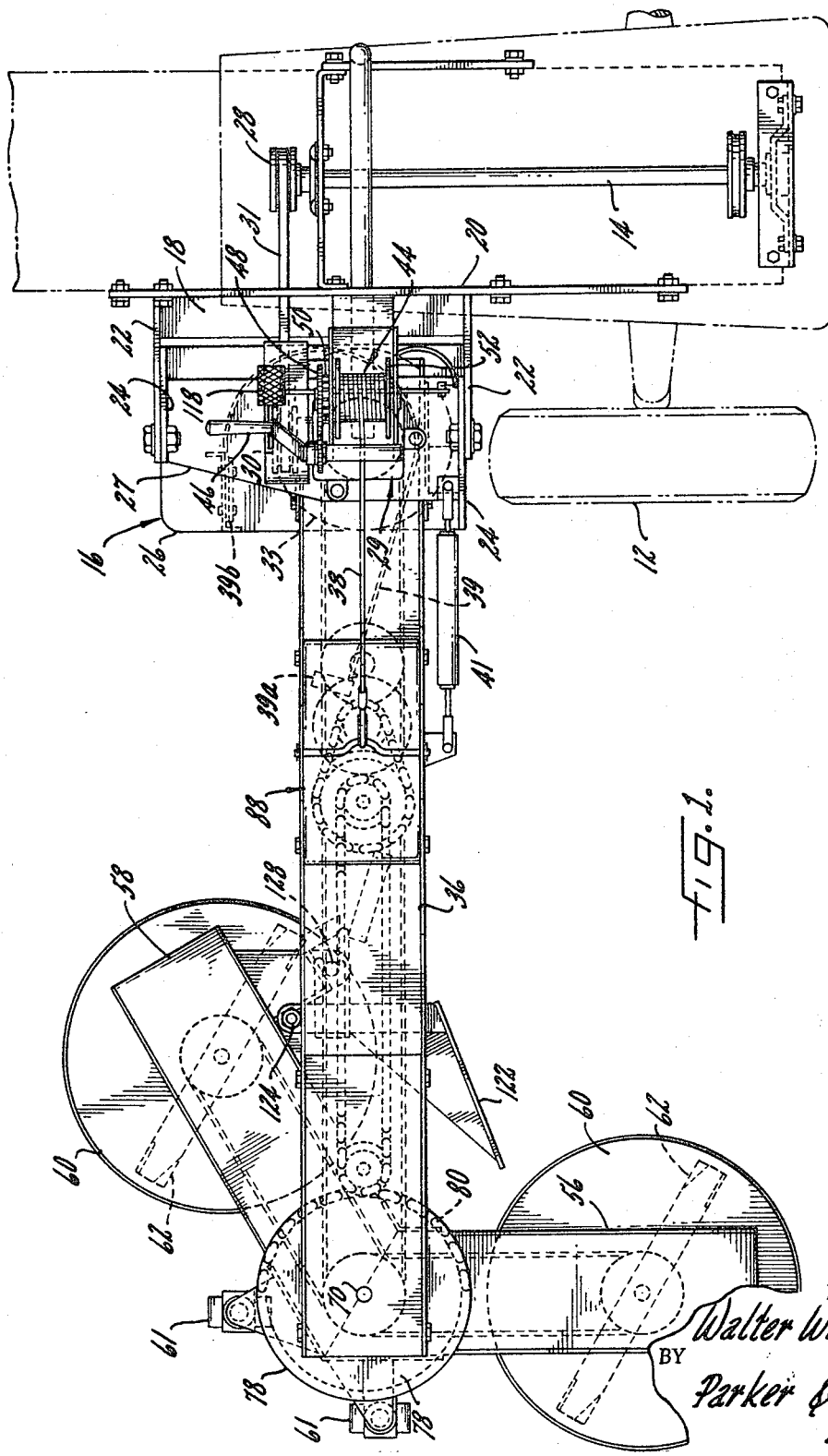
Figure 7:
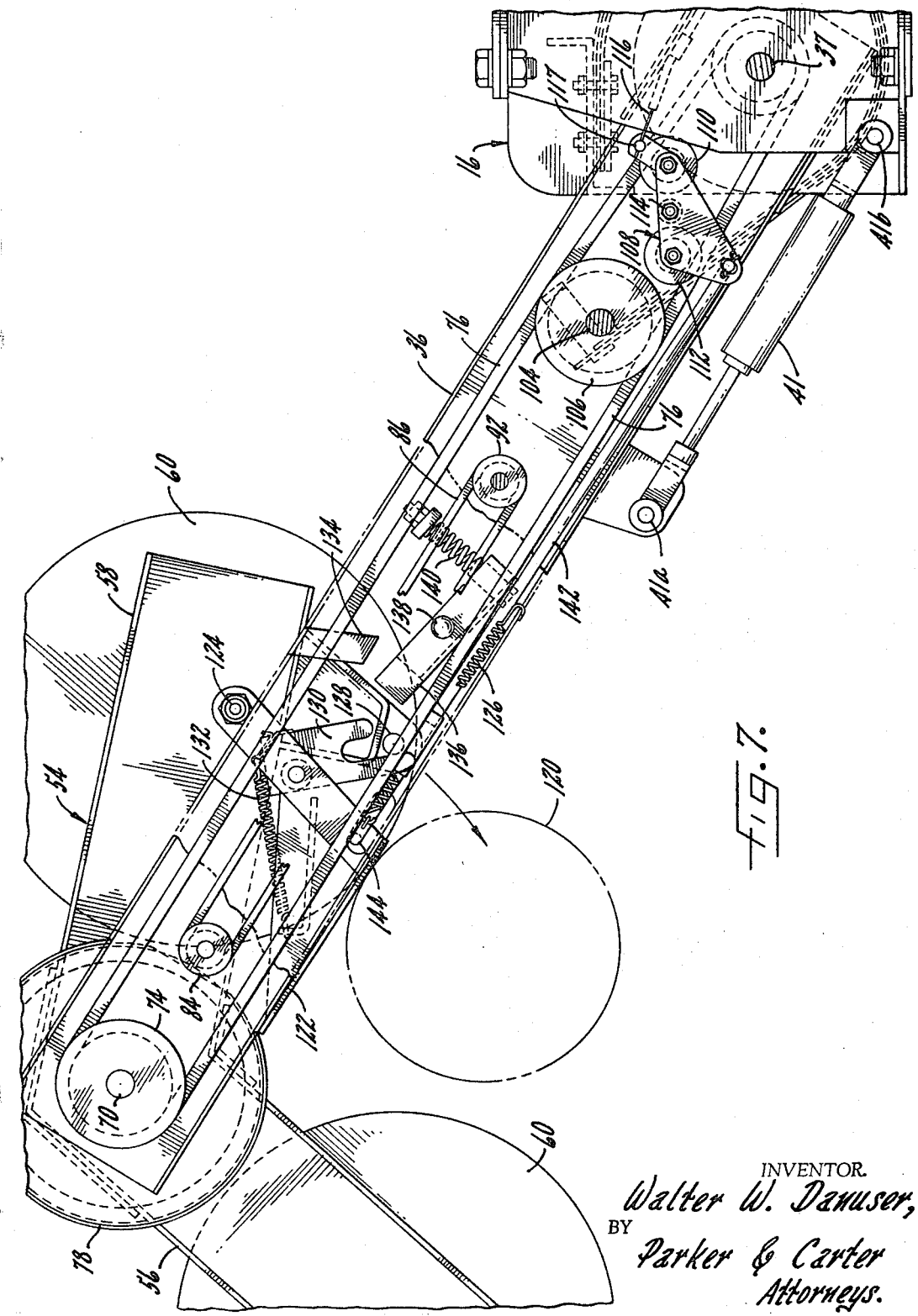

The invention is illustrated diagrammatically in the following drawings wherein:

FIGURE 1 is a top plan view of the mower described herein, showing its attachment to a tractor, FIGURE 2 is a front view of the mower shown in FIGURE 1, FIGURE 3 is a top plan view of the mower attachment illustrating the details of the mower drive, FIGURE 4 is a section taken along line 4—4 of FIGURE 3 of the mower attachment illustrated in FIGURE 3, FIGURE 5 is an enlarged partial top view of the mower attachment just prior to contact with an object in the mowing path, FIGURE 6 is a fragmentary top plan view of the mower attachment just after contact with an object in the mowing path, FIGURE 7 is a top view, similar to FIGURE 5, illustrating the mower after movement by the object, FIGURE 8 is a view, similar to FIGURE 5, illustrating the mower just prior to completion of its rotation, FIGURE 9 is an enlarged partial side elevation of FIGURE 5, FIGURE 10 is a partial front view of a modified form of mower, and FIGURE 11 is a partial top view of the mower shown in FIGURE 10.

In FIGURES 1 and 2, a tractor is shown in outline with one of the wheels being indicated at 12. The tractor may have a drive shaft 14 for driving the wheels 12 with the drive for the mower attachment being taken off of the drive shaft 14. A support bracket indicated generally at 16 may be mounted on one side of the tractor and may include a lower plate 18, a back plate 20 and side plates 22. Pivotally mounted to the side plates 22 are plates 24 connected together by a bottom plate 26. A second cross plate 27 mounts a drive coupling 29 having a sheave 30 connected to a sheave 28 on main drive shaft 14 through drive belt 31. A sheave 32 is at the bottom of the coupling and is used to drive the mower attachment.

Pivotally attached to the bottom plate 27 is a circular plate 33 which mounts a support arm 36 by means of flanges 35. Circular plate 33 is free to pivot about rod 37a which is in alignment with the coupling drive shaft 37 mounting sheave 32. A leaf spring 39 may be attached to support 36, as at 39a, and to bracket 16 as at 39b. Note that spring 39 curves beneath bracket 16. Spring 39 is used to maintain the support in an appropriate position relative to the tractor during normal mowing. A shock absorber 41 in the form of a piston and cylinder assembly may be pivotally attached to arm 36, as at 41a, and may be pivotally attached to bracket 16, as at 41b. The shock absorber 41 prevents arm 36 from snapping back after it has been moved, against the force of spring 39, by contact between the arm and an object in the mowing path.

Support 36 extends outwardly from the tractor and may be raised and lowered by means of a cable 38 attached to a housing 40 on the support 36. The cable 38 advances through an opening 42 to a winch indicated generally at 44. The winch is driven from a handle 46, which may be manual or automatic, but as shown herein, is manual. The handle 46 is effective to rotate a gear 48 which in turn drives a smaller gear 50 which turns a cable drum 52 to wind up the cable or to pay it out. The raised position of the support 36 is illustrated in dotted lines in FIGURE 2.

Mounted at the end of support 36 is a frame indicated generally at 54 and including a pair of arms 56 and 58. Arms 56 and 58 each mount a blade housing 60 with a rotatable blade 62 being mounted within each housing 60. Pivotable wheels or the like 61 may be used to support frame 54 above the ground and to properly position the blades for mowing. As illustrated in FIGURES 3 and 4, each blade has a drive 64 which is driven from a sheave 66 through a drive belt or the like 68. The drive belts 68 for the two blades are driven from sheaves 72 on a central drive shaft 70. The central drive shaft 70 is in turn driven from an upper sheave 74 through a drive belt 76 which passes about sheave 32. As can be seen from the above description the two rotating blades are driven from a common drive and the common drive may be taken directly from the tractor drive shaft, although it could be otherwise.

The frame arms 56 and 58 preferably form an angle other than 180 degrees, and an angle on the order of about 120 degrees has been found to be satisfactory, although the invention should not be limited to this angular relationship. The frame arms 56 and 58 are fixed to a spindle plate 78 which is rotatable on drive shaft 70. Fixed to the underneath side of spindle plate 78 is a drive member, for example, a chain 80 which may extend completely about the circumference of plate 78. Note particularly FIGURES 1 and 3 in which the chain is clearly shown. A sprocket or the like 82 is rotatable on support 36 and is in driving engagement with chain 80. Sprocket 82 is driven from an upper sprocket 84 which is in engagement with a chain 86. Chain 86 is driven from a speed reduction unit 88 which may include a shaft 90 having a sprocket 92 in engagement with chain 86 and a large sprocket 94. Sprocket 94 may be in mesh with a sprocket 96 on shaft 98 with shaft 98 having a second sprocket 100. Sprocket 100 may be driven from a small sprocket 102 mounted on a shaft 104 having a sheave 106 at its opposite end. Sheave 106 may be driven directly from drive belt 76. The speed reduction unit 88 may have any satisfactory reduction ratio and a ratio of 15:1 has been found to be practical.

For normal mowing sheave 106 is not in contact with drive belt 76. An idler assembly 108 including idlers 110 and 112 in contact with opposite sides of belt 76, is pivotally attached to support 36 as at 114. When the idlers are in the position of FIGURE 5, note that belt 76 is not in driving contact with sheave 106.

In one method of rotating the mowing heads, a cable 116 which is attached to the idler assembly, as at 117, and is connected to a foot pedal 118 appropriately positioned for the driver, is used to pivot the assembly 108 in a clockwise direction. When the tractor driver presses down on the cable, it will pivot idler assembly 108. This position of the idler assembly is illustrated in FIGURE 7. Note that belt 76 now drives sheave 106 to rotate the mowing heads through the speed reduction unit 88 and chain 86.

In a second method of rotating the mowers, mower rotation is initiated upon contact of the mowing arm with an object within the mowing path, for example a post, stone or the like. Such an object is indicated at 120 in FIGURE 5, which illustrates the mowing heads and supporting arm just prior to contact. FIGURE 6 illustrates the position of the support arm 36 after contact, FIGURE 7 illustrates the position of the mower support arm 36 and its components during rotation of the heads, and FIGURE 8 illustrates the position of these members just prior to the time that the mowing heads return to their original mowing position.

In FIGURE 5, a bumper 122 which extends outwardly from support arm 36 may be pivotally mounted as at 124 to the support arm. A spring or the like 126 is used to bias the bumper in an outward direction as illustrated in FIGURE 5. One of the mowing heads, in this case the head attached to arm 58, may have an upwardly extending detent 128 which extends between the generally parallel fingers of a spring-loaded gate 130. The gate is pivotally mounted to the bottom of the bumper 122 and is biased to the position of FIGURE 5 by a spring 132 connected between the gate and bumper. A fixed ram 134 is positioned on the bottom of the support arm 36 and cooperates with a spring-loaded stop lug 136 to hold the gate 130 in the position of FIGURE 5. Stop lug 136 pivots about an axis 138 and spring 140 biases the stop lug to the position of FIGURE 5. A rod 142 may be pivotally connected at one end of the idler assembly 108 and extends within support arm 36 toward the bumper. The rod 142 may have a down-turned portion 144 extending through a slot 146 in the bottom of support 36 into a pivotal connection with the bumper. Spring 126 is connected between support 36 and rod 142 to urge the rod and bumper to the position of FIGURE 5. An adjustment collar 143 may be used to vary the length of rod 142.

When the mowing heads are in the position of FIGURE 5, detent 128 is locked in position by gate 130 and hence the mowing heads cannot rotate. As soon as bumper 122 contacts an object in the mowing path, the bumper will be pivoted in a clockwise direction to the position of FIGURE 6. As the bumper pivots, it will move rod 142 toward the left, as shown in FIGURE 5, to rotate idler assembly 108 in a clockwise direction so that sheave 106 may be driven from drive belt 76. At the same time gate 130, which is pivotally attached to the bumper, will be moved in a clockwise direction to release detent 128. As gate 130 is pivoted, it will move to a position where it can clear stop lug 136. The mowing heads can now rotate in a clockwise direction as they are driven by chain 86, sprocket 82 and chain 80. Movement of the detent 128 in a clockwise direction will pivot gate 130 on the bumper as the gate has now been released from stop lug 136.

FIGURE 7 illustrates the position of the mowing heads after release of the detent 128. Note that support arm 36 has been pivoted in a clockwise or rearward direction by the object in the mowing path. The mowing heads have now started to rotate to mow about the object. As the tractor drives by the object in question, the arm will remain in the rearward pivoted position of FIGURE 7, as the mowing heads rotate about the object. After the tractor has gone past the object and the support arm 36 has been pivoted rearwardly a sufficient amount, it will clear the object. The mowing heads will continue to rotate and will mow about the front of the object. The return of support arm 36 to its original position will be cushioned by shock absorber 41.

FIGURES 10 and 11 illustrate a modified form of mower in which the mower is operated hydraulically. A hydraulic pump 150, which may be driven from the tractor engine, is connected by lines 152 to a hydraulic motor 154. Motor 154 is used to drive sheave 32 and the motor attachment will operate as described above. The invention should not be limited to a hydraulic motor as other fluid systems may be satisfactory.

The use, operation and function of the invention are as follows:

In utilizing a mower attachment of the type described, the operator, who may be seated on the tractor, first operates the winch to lower support 36 and the mower attachment. The position of the two mower heads for normal mowing is as shown in FIGURES 1, 3 and 5. Note that the mower blades overlap in path so that there is no uncut area of grass between the blades. The operator of the tractor merely drives the mower along a predetermined path to cut a certain swath of grass or whatever else is being mowed. When an immovable or stationary object is reached, such object will be contacted by the bumper or some other leading portion of the mower frame. When the bumper contacts an object, the idler assembly 110 will be rotatable or pivoted to permit the tractor drive to rotate the mowing heads. Arms 56 and 58 and the attached rotating blades will be rotated in a clockwise direction to mow about the stationary object. The frame will continue to rotate until the heads have rotated through a full circle or approximately 360 degrees, at which time the detent will again lock the heads in a normal mowing position. This is assuming that the bumper has been released to its original position.

Note that the rotation of the frame and blades is automatic upon contact with an object in the mowing path. Furthermore, note that the frame and blades are rotated through approximately 360 degrees to mow completely about the object. The relative angular position of the arms and the blades is so fixed that the blades will rotate about the fixed object as the tractor continues to move forward. The support 36 and blades are free to pivot on the tractor so that the tractor can continue to move at normal speed. Spring 39 will return the support to its original position with shock absorber 41 cushioning the return. The particular angular relationship between the frame arms and the speed at which the frame is rotated is important, as this relationship must permit complete mowing about an object without excessive lag behind the tractor.

In addition to the automatic operations described above, the mowing heads may be rotated at any time and through any arc by the operator. By pressing down on pedal 118 the idlers will be pivoted to connect the tractor drive to the speed reduction unit. As the idler assembly pivots it will push arm 142 to release the detent as described above. The heads will rotate as long as pedal 118 is held down.

Not only is the support 36 pivotal to raise and lower the mower attachment, but it is pivotal about a vertical axis to permit the mower attachment to lag behind the tractor when mowing around an object, for example a post.

The invention should not be limited to a gear reduction ratio of 15:1 nor to an angle of about 120 degrees between frame arms. However, this particular angular relationship and speed reduction ratio have been found to be satisfactory. Other speed reduction ratios as well as other angular relationships may also be practical.

The invention should not be limited to use on a small tractor of the type described. The invention is equally adaptable to larger tractors and to small home-type lawn mowers which are not tractor-driven nor tractor-mounted, but are pushed by the operator.

Support 36 can be set at any angle between almost 90 degrees above the horizontal to almost 25 degrees below the horizontal to trim hedges and to cut sloping areas or hills. Although not shown, it is possible to arrange support 36 to tilt about an axis parallel to the ground to a forward or reverse angle relative to the ground. Such an arrangement has advantages in certain types of mowing.

Whereas the preferred form of the invention has been shown and described herein, it should be realized that many modifications, alterations and substitutions thereto may be made within the terms of the following claims.

I claim:

1. In a rotary mower, a pair of blades, a frame having a pair of arms forming an angle smaller than 180 degrees, a housing fixed to each arm with one of said blades being rotatable in each housing, a common drive means for said blades, means for supporting said frame and blades above the ground, drive means operable during mowing for causing rotation of the frame and blades in only one direction through a predetermined arc about an object in the mowing path and adapted to return said frame generally to its original mowing position, and said drive means further including a drive element consisting of a chain fixed to said rotatable frame and a driven element consisting of a sprocket driven from said common drive means and in driving engagement with said drive element.

2. The structure of claim 1 further characterized by and including speed reduction means between said driven element and said common drive means.

3. The structure of claim 1 further characterized in that said pair of arms form an angle on the order of about 120 degrees.

4. The structure of claim 1 further characterized in that the means for rotating the frame and rotating blades is operable upon contact by the frame with an object in the mowing path.

5. The structure of claim 1 further characterized in that the means for rotating the frame and rotating blades is driven from the common drive means for the blades.

6. The structure of claim 1 further characterized by and including locking means for holding said frame in a predetermined position on said mower, said means for causing rotation of said frame being effective to release said locking means.

7. In a rotary mower, a pair of blades, a frame having a pair of arms, a housing fixed to each arm with one of said blades being rotatable in each housing, a support for said frame, common drive means for said blades passing through said support, means for raising and lowering said frame and blades relative to the ground, drive means driven from said common drive means, and operable during mowing for rotating the frame and the blades in only one direction about an object in the mowing path, said drive means adapted to return the frame and rotating blades generally to their original mowing position, locking means for holding the frame in a predetermined position on said support, and means for drivingly connecting said drive means to said common drive means and adapted to release said locking means.

8. The structure of claim 7 further characterized in that said pair of arms forms an angle smaller than 180 degrees.

9. The structure of claim 7 further characterized in that said blades are spaced about generally parallel axes and said common drive means rotates each blade about its respective axis.

10. The structure of claim 7 further characterized by and including a tractor mounting said support and rotatable frame, said common drive means being taken from the tractor drive.

11. The structure of claim 7 further characterized by and including means for initiating frame rotation upon contact between said frame and an object in the mowing path.

12. The structure of claim 7 further characterized in that said common drive means and said drive means for rotating the frame and blades are hydraulically driven.

References Cited

UNITED STATES PATENTS

| 2,838,901 | 6/1958 | Davis | 56—25.4 |
|---|---|---|---|
| 2,926,480 | 3/1960 | Kimball | 56—235 |
| 2,976,663 | 3/1961 | Smith et al. | 56—25.4 |
| 3,183,651 | 5/1965 | Hoefler | 56—25.4 |
| 3,200,574 | 8/1965 | Meadowcroft | 56—235 |
| 3,246,460 | 4/1966 | Patterson et al. | 56—235 |

ABRAHAM G. STONE, *Primary Examiner.*

R. A. RAZZANO, *Assistant Examiner.*